(12) United States Patent
Dickey et al.

(10) Patent No.: US 11,686,834 B2
(45) Date of Patent: Jun. 27, 2023

(54) ONE WAY RANGING SYNCHRONIZATION AND MEASUREMENT

(71) Applicant: Silicon Laboratories Inc., Austin, TX (US)

(72) Inventors: Terry Lee Dickey, Austin, TX (US); Yan Zhou, Spicewood, TX (US); Michael Wu, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 137 days.

(21) Appl. No.: 17/486,037

(22) Filed: Sep. 27, 2021

(65) Prior Publication Data

US 2023/0015164 A1     Jan. 19, 2023

Related U.S. Application Data

(60) Provisional application No. 63/221,149, filed on Jul. 13, 2021.

(51) Int. Cl.
  *G01S 13/40*    (2006.01)
  *G01S 5/02*     (2010.01)
(52) U.S. Cl.
  CPC ............. *G01S 13/40* (2013.01); *G01S 5/021* (2013.01)
(58) Field of Classification Search
  CPC ................................. G01S 13/40; G01S 5/021

USPC ........................................... 342/86, 147, 352
See application file for complete search history.

(56) References Cited

U.S. PATENT DOCUMENTS

| | | | |
|---|---|---|---|
| 7,218,901 B1 * | 5/2007 | Mobley | H04N 21/2362 455/182.2 |
| 8,325,704 B1 * | 12/2012 | Lemkin | H04J 3/0667 370/347 |
| 2003/0053493 A1 * | 3/2003 | Graham Mobley | H04N 21/6118 370/538 |

* cited by examiner

*Primary Examiner* — Bo Fan
(74) *Attorney, Agent, or Firm* — Nields, Lemack & Frame, LLC

(57) ABSTRACT

A system and method for one-way ranging is disclosed. The system comprises a transmitter, also referred to as tag, transmitting a packet having a first frequency. The receiver, also referred to as the locator, receives the first frequency and measures the phase at a specific point in time. At a predetermined time, the transmitter switches to a second frequency. This is performed while maintaining phase continuity. The receiver also switches to the second frequency at nearly the same time. The receiver then measures the phase of the second frequency at a second point in time. Based on these two phase measurements, the distance between the transmitter and the receiver may be calculated.

18 Claims, 8 Drawing Sheets

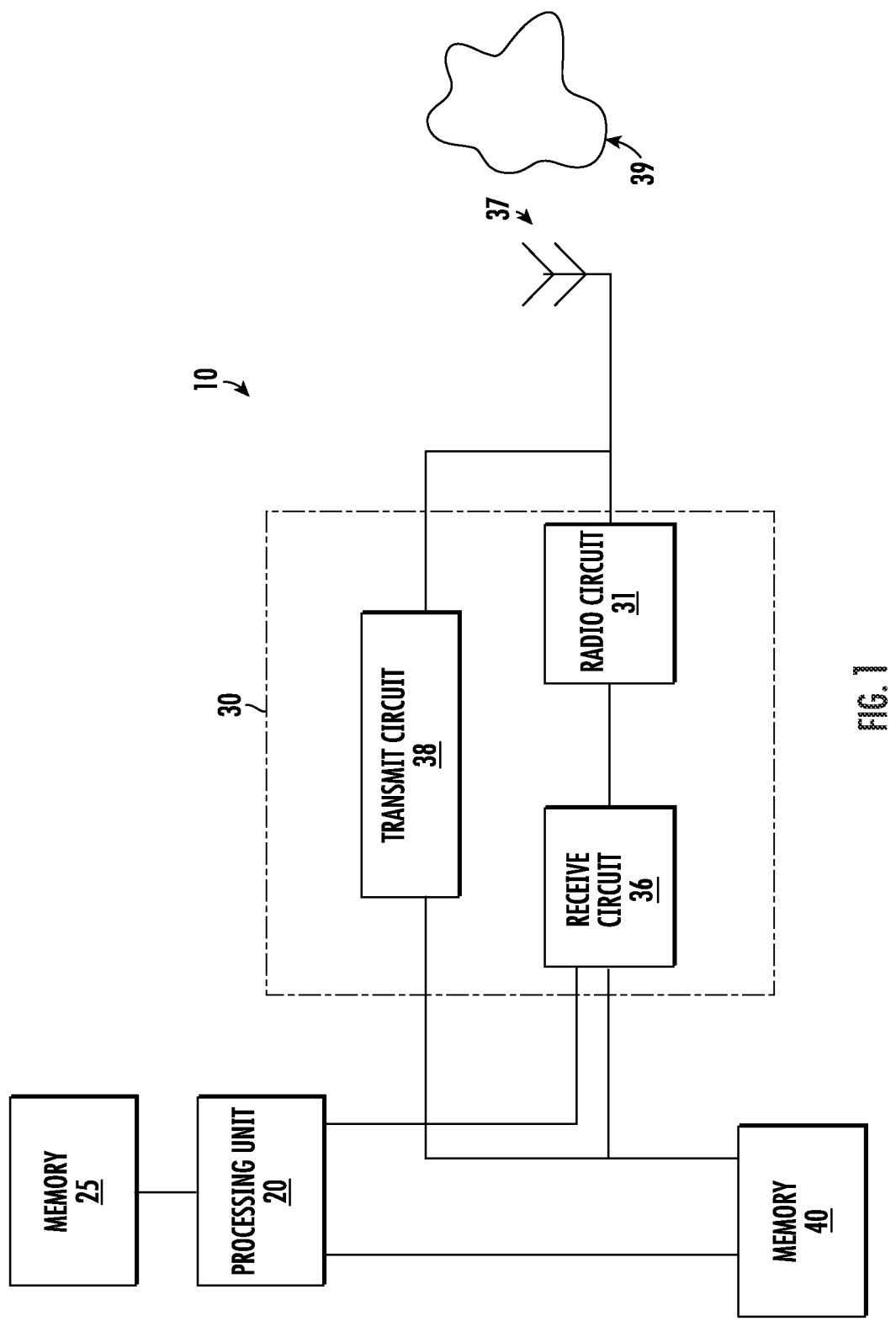

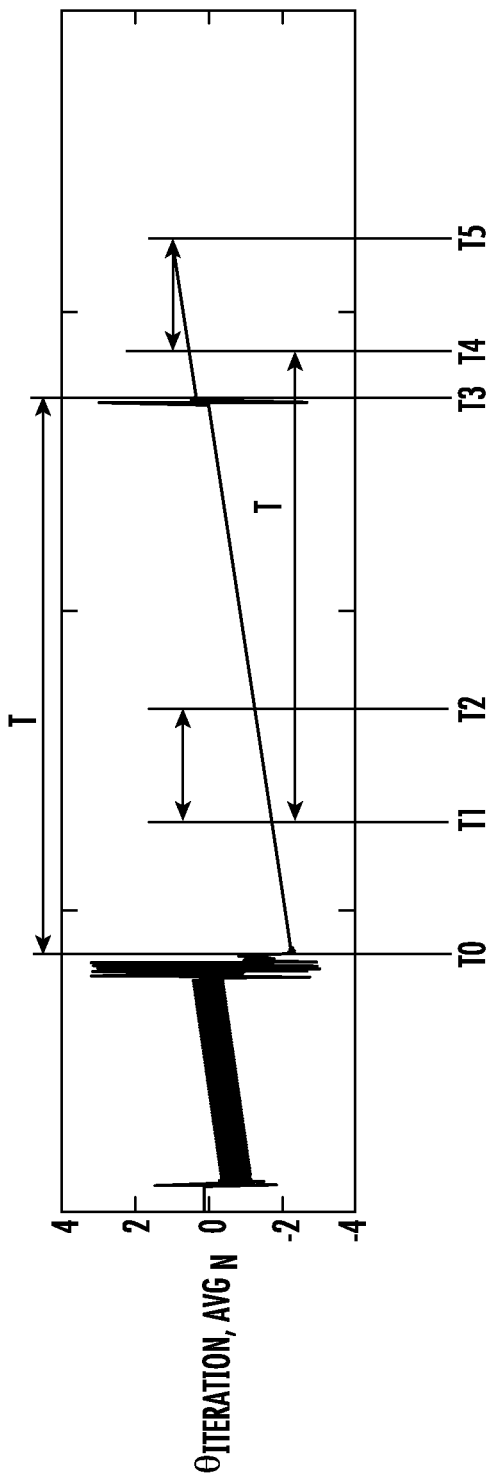

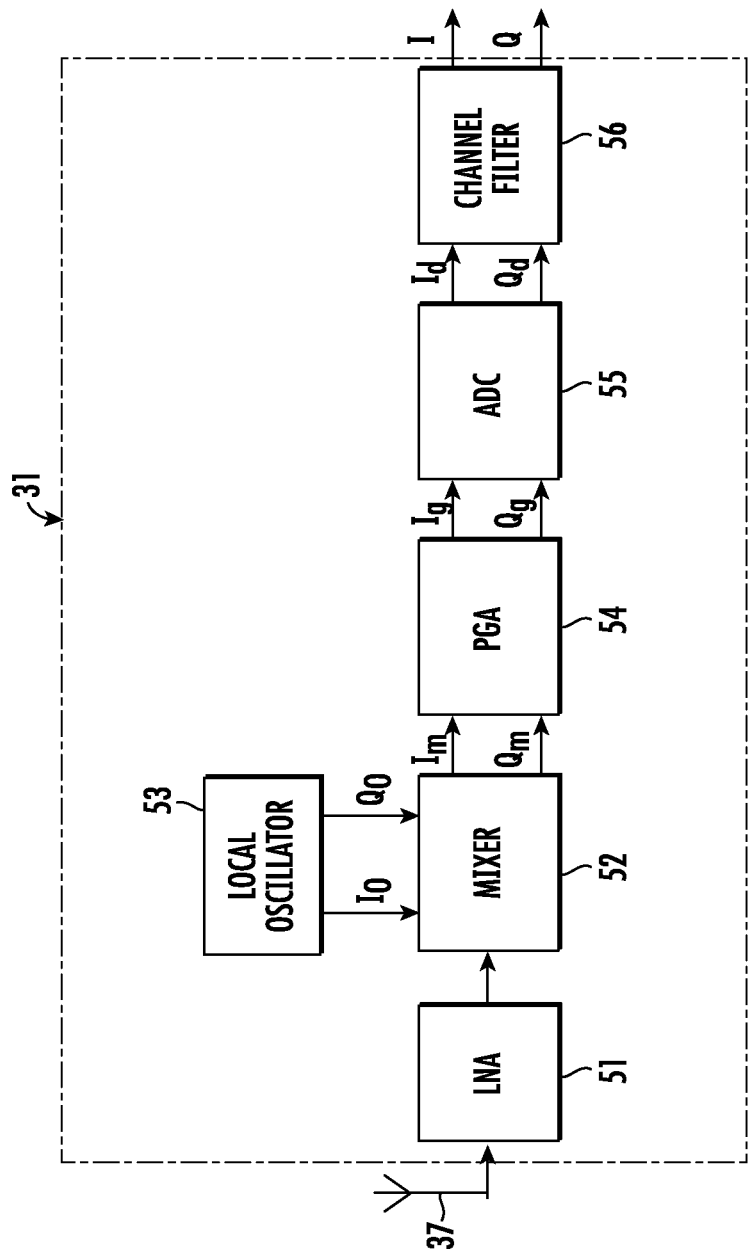

ONE WAY RANGING SYNCHRONIZATION AND MEASUREMENT

This application claims priority to U.S. Provisional Patent Application 63/221,149, filed Jul. 13, 2021, the disclosure of which is incorporated in its entirety.

FIELD

This disclosure describes systems and methods for determining a distance between network devices, and more particularly for determining a distance without establishing a connection between the network devices.

BACKGROUND

There is currently interest in expanding current network protocols to allow the possibility for a network device to determine the distance to another network device. For example, the Bluetooth specification is being modified to include High Accuracy Distance Measurement (HADM). As currently proposed, HADM discloses basic measurement techniques for two-way ranging. Two-way ranging requires the establishment and maintenance of a network connection between an initiator and a reflector. Since a network connection is established, security can be provided. However, by requiring a network connection, HADM is difficult to scale to a large number of network devices being tracked.

Therefore, it would be beneficial if there were a system and method to determine the distance between two network devices without requiring the establishment of a network connection between these two network devices. Further, it would be advantageous if these system and method were as accurate as the current HADM process.

SUMMARY

A system and method for one-way ranging is disclosed. The system comprises a transmitter, also referred to as a tag, transmitting a packet having a first frequency. The receiver, also referred to as the locator, receives the first frequency and measures the phase at a specific point in time. At a predetermined time, the transmitter switches to a second frequency. This is performed while maintaining phase continuity. The receiver also switches to the second frequency at nearly the same time. The receiver then measures the phase of the second frequency at a second point in time. Based on these two phase measurements, the distance between the transmitter and the receiver may be calculated.

According to one embodiment, a method of determining a distance between two network devices is disclosed. The method comprises transmitting, from a first network device, a range detection packet, wherein the range detection packet comprises a first constant tone wherein a first frequency is transmitted and a second constant tone wherein a second frequency is transmitted and wherein there is phase continuity during a transition from the first constant tone to the second constant tone; receiving, at a second network device, the range detection packet; sampling, at the second network device, the range detection packet using a sample clock, wherein the sample clock has phase continuity during the transition from the first constant tone to the second constant tone, wherein the second network device samples a phase of the first constant tone to create a first sample having a first phase and samples a phase of the second constant tone to create a second sample having a second phase; determining a frequency difference between a clock used by the first network device and the second network device; using the frequency difference, the first phase and the second phase to determine a distance from the second network device to the first network device. In certain embodiments, the second network device samples the first constant tone a plurality of times to create a plurality of samples, recording a phase of the first constant tone and a time of each sample, and uses a difference in phase divided by a difference in time to determine the frequency difference. In some embodiments, the second network device creates a line based on the plurality of samples, calculates a variance of the line and determines a quality metric based on the variance. In some embodiments, the second network device discards the plurality of samples if the variance is above a predetermined threshold. In certain embodiments, a time between when the first network device begins transmitting the first constant tone and starts transmitting the second constant tone is defined as T and is equal to a time between when the second network device creates the first sample and when the second network device creates the second sample. In some embodiments, the first network device transmits a transmitter phase correction value to the second network device prior to the range detection packet, the transmitter phase correction value being a difference in phase delay through transmit components of the first network device at the first frequency and the second frequency, and wherein the second network device uses the transmitter phase correction value to determine the distance from the second network device to the first network device. In some embodiments, a receiver group delay is calculated for the second network device, the receiver group delay defined as a difference in phase delay through read components of the second network device at the first frequency and the second frequency, and the second network device uses the receiver group delay to determine the distance from the second network device to the first network device. In certain embodiments, the second network device calculates a time lag, the time lag defined as a difference between a time that the second network device begins sampling at the second frequency and a time that the first network device switches to the second constant tone. In some embodiments, the second network device uses the time lag to determine the distance from the second network device to the first network device.

According to another embodiment, a system for measuring a distance between two network devices is disclosed. The system comprises a first network device to transmit a range detection packet, wherein the range detection packet comprises a first constant tone wherein a first frequency is transmitted and a second constant tone wherein a second frequency is transmitted and wherein there is phase continuity during a transition from the first constant tone to the second constant tone; and a second network device, comprising: a network interface, a processing unit, and a storage device containing instructions, which when executed by the processing unit, enable the second network device to: receive the range detection packet; sample the range detection packet using a sample clock, wherein the sample clock has phase continuity during the transition from the first constant tone to the second constant tone, wherein the second network device samples the first constant tone to create a first sample having a first phase and samples the second constant tone to create a second sample having a second phase; determine a frequency difference between a clock used by the first network device and the second network device; and determine a distance from the second network device to the first network device using the frequency difference, the first phase and the second phase. In some embodiments, the second network device samples the first constant tone a plurality of times to create a plurality of samples, records a phase of the first constant tone and a time of each sample, and uses a difference in phase divided by a difference in time to determine the frequency difference. In some embodiments, the second network device creates a line based on the plurality of samples, calculates a variance of the line and determines a quality metric based on the variance. In some embodiments, the second network device discards the plurality of samples if the variance is above a predetermined threshold. In certain embodiments, a time between when the first network device begins transmitting the first constant tone and starts transmitting the second constant tone is defined as T and is equal to a time between when the second network device creates the first sample and when the second network device creates the second sample. In some embodiments, the first network device transmits a transmitter phase correction value to the second network device prior to the range detection packet, the transmitter phase correction value being a difference in phase delay through transmit components of the first network device at the first frequency and the second frequency, and wherein the second network device uses the transmitter phase correction value to determine the distance from the second network device to the first network device. In certain embodiments, a receiver group delay is calculated for the second network device, the receiver group delay defined as a difference in phase delay through read components of the second network device at the first frequency and the second frequency, and the second network device uses the receiver group delay to determine the distance from the second network device to the first network device. In some embodiments, the second network device calculates a time lag, the time lag defined as a difference between a time that the second network device begins sampling at the second frequency and a time that the first network device switches to the second constant tone. In some embodiments, the second network device uses the time lag to determine the distance from the second network device to the first network device.

BRIEF DESCRIPTION OF THE DRAWINGS

For a better understanding of the present disclosure, reference is made to the accompanying drawings, in which like elements are referenced with like numerals, and in which:

FIG. 1 is a block diagram of a network device that may be used to perform the method described herein;

FIG. 2A shows a first network device transmitting a range detection packet to a second network device;

FIG. 2B shows the phase vs. time of an incoming signal;

FIG. 4 is a block diagram of the radio receiver of the network device of FIG. 1;

FIG. 6 shows the time lag that may be compensated for;

DETAILED DESCRIPTION

Figure 3A:
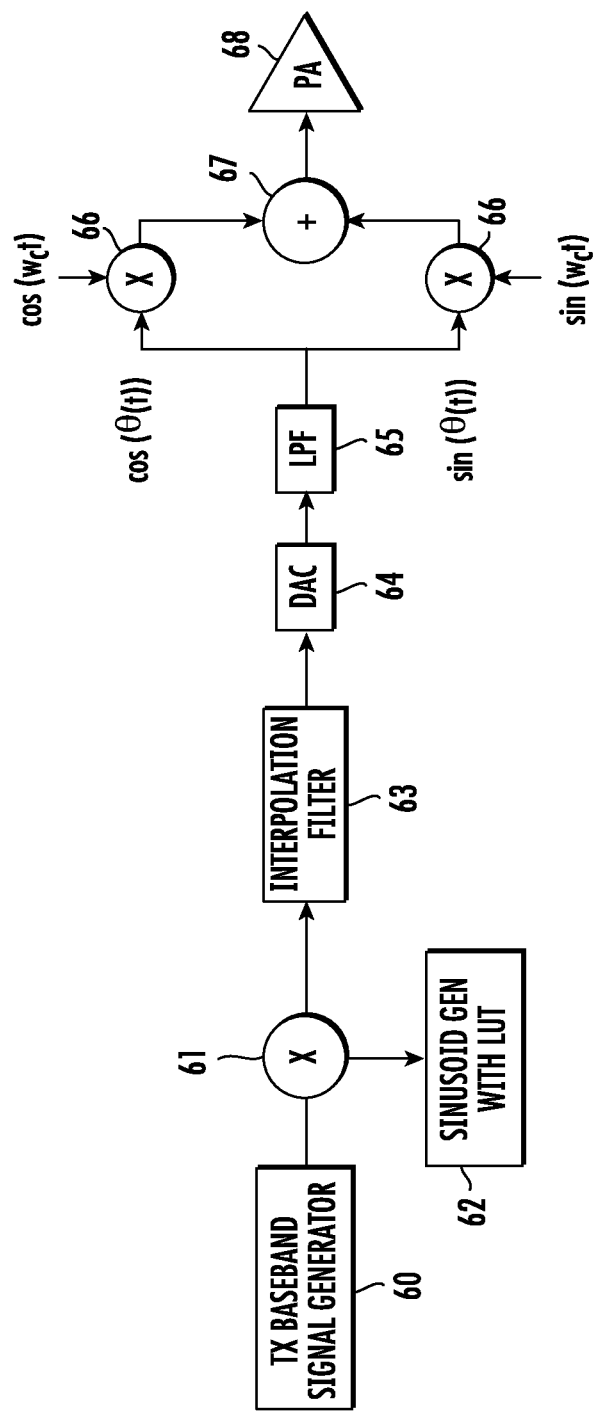
FIG. 3A-3B show a transmit circuit according to two embodiments.

FIG. 1 shows a network device that may be used to perform the range detection algorithm described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna 37. The network interface 30 may support any wireless network protocol that supports range detection, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a receive circuit 36. The receive circuit 36 is used to receive, synchronize and decode the digital signals received from the radio circuit 31. Specifically, the receive circuit 36 has a preamble detector that is used to identify the start of an incoming packet. The receive circuit 36 also has a sync detector, which is used to identify a particular sequence of bits that are referred to as a sync character. Additionally, the receive circuit 36 has a decoder which is used to convert the digital signals into properly aligned bytes of data.

The network interface 30 also includes a transmit circuit 38. The transmit circuit 38 may include a power amplifier that is used to supply a signal to be transmitted to the antenna 37.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Having described the basic architecture of the network device, a description of the one way ranging procedure will be provided.

First, referring to FIG. 2A, assume a first network device 100, also referred to as the tag or transmitter, transmits a first signal, having a constant frequency of $f_1$. The phase of that signal may be measured by the second network device 110, also referred to as the locator or receiver, and is given by:

$$\theta_1 = (\omega_{init1} - \omega_{ref11}) * t + \theta_{init} - \theta_{ref1} + 2\pi f_1 t_p$$

In this equation, $\theta_1$ is the phase of the first signal, as measured by the second network device 110. $\omega_{init1}$ is the angular frequency of clock used by the first network device 100 to generate the first signal. $\omega_{ref1}$ is the angular frequency of clock used by the second network device 110 to determine when to measure the phase of the first signal. $\theta_{init}$ is the initial phase of the first signal as transmitted by the first network device 100. $\theta_{ref1}$ is the initial phase of the clock used by the second network device 110 to sample the phase of first signal. $t_p$ is the path length, in seconds.

The first network device 100 then transmits a second signal, having a constant frequency of $f_2$. The phase of that signal may be measured by the second network device 110 and is given by:

$$\theta_2 = (\omega_{init2} - \omega_{ref12}) * t + \theta_{init} - \theta_{ref1} + 2\pi f_2 t_p$$

In this equation, $\theta_2$ is the phase of the second signal, as measured by the second network device 110. $\omega_{init2}$ is the angular frequency of clock used by the first network device 100 to generate the second signal. $\omega_{ref12}$ is the angular frequency of clock used by the second network device 110 to determine when to measure the phase of the second signal. $\theta_{init}$ is the initial phase of the second signal as transmitted by the first network device 100. $\theta_{ref1}$ is the initial phase of the clock used by the second network device 110 to sample the phase of the second signal.

Assume that $\Delta\omega 2 = \omega_{init2} - \omega_{ref12}$ and $\Delta\omega 1 = \omega_{init1} - \omega_{ref11}$. If $\Delta\omega 2$ and $\Delta\omega 1$ can be determined, the difference in phase can be used to measure the path length, in terms of time.

Assume that the phase of the first signal is sampled by the second network device 110 by a first clock, defined as $\omega_{ref1} * t + \theta_{ref1}$. If $\omega_{init1}$ and $\omega_{ref11}$ are exactly the same, the phase sampled by the first clock would be constant. However, if there is a difference between $\omega_{init1}$ and $\omega_{ref11}$, the phase will change. In fact, the change in phase as a function of time is linear, and is directly proportional to the difference between $\omega_{init1}$ and $\omega_{ref11}$. Thus, if the phase is sampled a plurality of times by the second network device 110 as the first signal is being received, $\Delta\omega 1$ can be determined. This analysis also applied to $\Delta\omega 2$, if necessary.

FIG. 2B shows a diagram showing the signal transmitted by the first network device 100 and the actions taken during this transmission. First, as shown at time T0, the first network device 100 begins transmitting the first signal having the first frequency. At a fixed time after T0, labelled T1, the second network device 110 begins measuring the phase of the first signal. Also, at time T1, the second network device 110 begins a timer. The second network device 110 may stop measuring the phase of the first signal at T2. At time T3, the first network device 100 switches to transmitting the second signal at the second frequency. The time between T0 and T3 is predetermined and is referred to as T. At time T4, the second network device 110 begins measuring the phase of the second signal. Note that the time between T0 and T3 is equal to the time between T1 and T4. The second network device 110 may stop measuring the phase of the second signal at T5.

The second network device 110 may utilize two or more phase measurements taken between T1 and T2 to determine the $\Delta\omega 1$ value. For example, the second network device 110 may calculate $[\varphi(t) - \varphi(t+\Delta t)]/\Delta t$, wherein t and $t+\Delta t$ are both between T1 and T2, and $\Delta t$ is an integral multiple of the period of $\omega_{ref11}$. This value is the difference in angular frequency between signal transmitted by the first network device 100 and the sample clock used by the second network device 110 during the first signal. In other words, this value represents $\Delta\omega 1$. In certain embodiments, the second network device 110 may perform this calculation at a plurality of points, and average the results. In other embodiments, the second network device 110 may perform this calculation at a plurality of points, and discard any points that deviate from the average by a predetermined percentage, as disclosed in more detail below.

Once $\Delta\omega$ is calculated, the phase rotation due to the frequency offset between the two network devices can be eliminated. For example, for the first equation, it may be assumed that t=T1 and for the second equation, t=T4=T+T1. In other words:

$$\theta_1 = \Delta\omega 1 * t + \theta_{init} - \theta_{ref1} + 2\pi f_1 t_p, \text{ so}$$

$$\theta_1 = \Delta\omega 1 * T1 + \theta_{init} - \theta_{ref1} + 2\pi f_1 t_p$$

Likewise:

$$\theta_2 = \Delta\omega 2 * t + \theta_{init} - \theta_{ref1} + 2\pi f_2 t_p, \text{ so}$$

$$\theta_2 = \Delta\omega 2 * T4 + \theta_{init} - \theta_{ref1} + 2\pi f_2 t_p \text{ and}$$

$$\theta_2 = \Delta\omega 2 * (T+T1) + \theta_{init} - \theta_{ref1} + 2\pi f_2 t_p$$

If it is assumed that $\Delta\omega 1$ and $\Delta\omega 2$ are nearly the same, then $\theta_1 - \theta_2 = 2\pi(f_1 - f_2)t_p - \Delta\omega * T$.

Since $\Delta\omega$ is known, this quantity can be subtracted to obtain the path length in seconds. Note that the above equation is applicable to any two points where the first point, Tx, is between T1 and T2 and the second point is T+Tx.

Thereafter, the second network device 110 may compare the phase at a point Tx, between T1 and T2 to the phase at a point Tx+T, which is between T4 and T5. The difference between these two values, which is corrected for the frequency offset as shown above, is indicative of the distance between these network devices. In other words, once corrected for frequency offset:

$$\theta_2 - \theta_1 = 2\pi(f_2 - f_1)t_p \text{ so that } tp = (1/2\pi) * (\theta_2 - \theta_1)/(f_2 - f_1).$$

Note that distance is equal to time multiplied by the speed of light, so distance can readily be calculated from the above equation.

Further, note that in the above calculations, it was assumed that the quantity $(\theta_{init} - \theta_{ref1})$ was constant for both frequencies, as they cancelled when the one equation was subtracted from the other. For this to be true, there must be phase continuity when the frequency being transmitted at the first network device 100 switches from the first frequency, f1, to the second frequency, f2. Similarly, there must be phase continuity at the second network device 110 when the sampling clock switches from f1 to f2.

FIG. 3A shows a first embodiment of a transmit circuit 38 that may be used to create two signals at two different frequencies where there is phase continuity between these signals during the frequency switch. The transmit circuit 38 includes the baseband signal generator 60, which is commonly used for all RF transmitters. The output of the baseband signal generator 60 enters a multiplier 61. The other input to the multiplier 61 is a sinusoidal generator 62 that utilizes a lookup table (LUT). The lookup table may be loaded with values that allow it to output sinusoidal waveforms of two or more different frequencies, where there is phase continuity at the frequency switching point. The output of the multiplier 61 then enters an interpolation filter 63, which is used to upsample the waveforms. Following the interpolation filter 63 is the digital to analog converter (DAC) 64, which converts the digital data into an analog waveform. Following the DAC 64 may be a low pass filter (LPF) 65. The output of the LPF 65 then splits and enters two carrier multipliers 66, which multiply the output of the LPF 65 by the sine and cosine of the carrier frequency, $\omega_c$, respectively. These two components are then summed using adder 67. This signal then enters the power amplifier (PA) 68, which is transmitted by antenna 37.

This embodiment may be utilized when the first network device 100 transmits the first frequency and the second frequency using one frequency channel. In other words, the carrier frequency is not changed during the transmission.

Figure 3B:
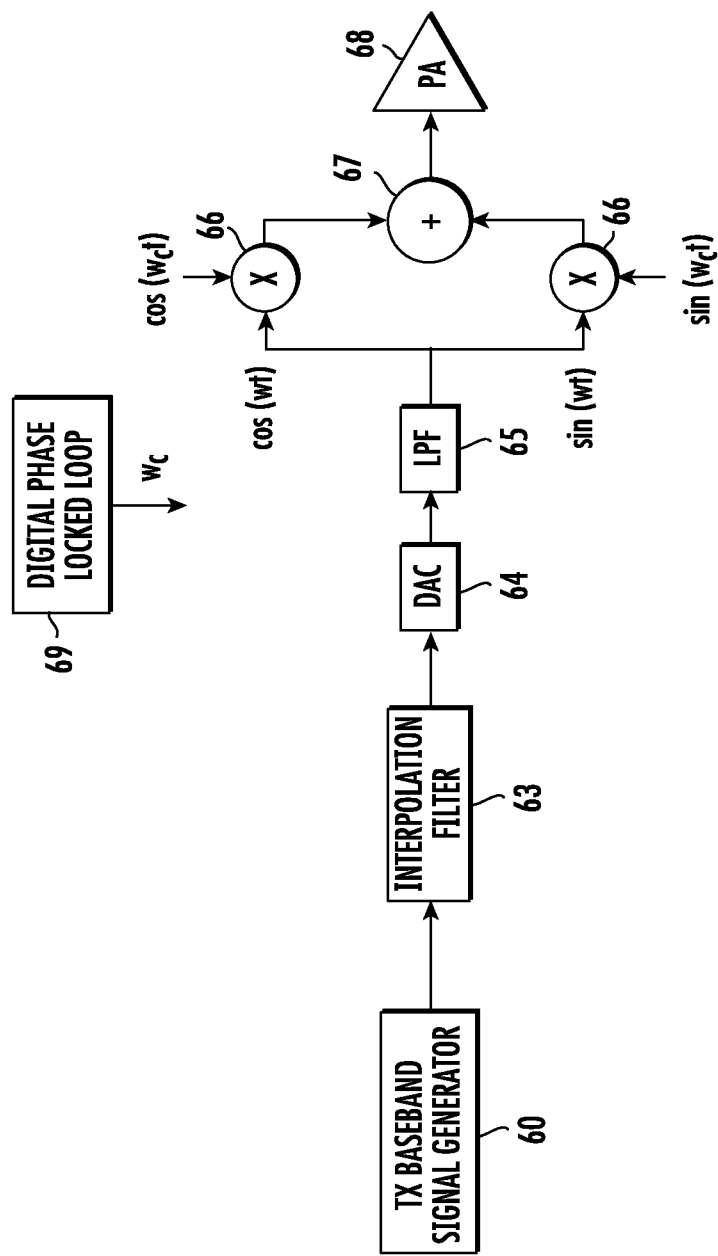

FIG. 3B shows a second transmit circuit 38 that may be used. Components that are common with the embodiment shown in FIG. 3A have been given identical reference designators and will not be described again. In this embodiment, the sinusoidal generator is replaced with a digital phase locked loop 69, which generates two different carrier frequencies, while maintaining phase continuity between the switch. Digital phase locked loops that achieve phase continuity during frequency switches are well known in the art and will not be further explained here. This embodiment may be utilized when the first network device 100 transmits the first frequency and the second frequency using two different frequency channels.

Of course, other implementations may be utilized that enable the first network device 100 to transmit two different frequencies having phase continuity during the frequency switch. These implementations may utilize one frequency channel or different frequency channels.

Thus, in all embodiments, the first network device 100 comprises a transmit circuit 38 that enables the first network device to transmit two different frequencies with phase continuity at the frequency switch.

Similarly, phase continuity must be maintained at the second network device 110 as well. FIG. 4 shows a block diagram of the radio circuit 31. The wireless signals first enter the radio circuit 31 through the antenna 37. This antenna 37 is in electrical communication with a low noise amplifier (LNA) 51. The LNA 51 receives a very weak signal from the antenna 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30.

Importantly, the ADC 55 is used to create the digital signals that are used to determine the phase of the incoming analog signal. Thus, the sample clock used by the ADC 55 to sample the incoming analog signal must also maintain phase continuity at the frequency switch. This may be achieved by using a digital phase locked loop, a lookup table or a digital mixer.

Thus, in all embodiments, the second network device 110 comprises a receive circuit that enables the second network device 110 to sample the incoming analog signal at two different frequencies, wherein there is phase continuity at the frequency switch. The resultant I and Q signals are used to perform the calculations described above.

Figure 5:
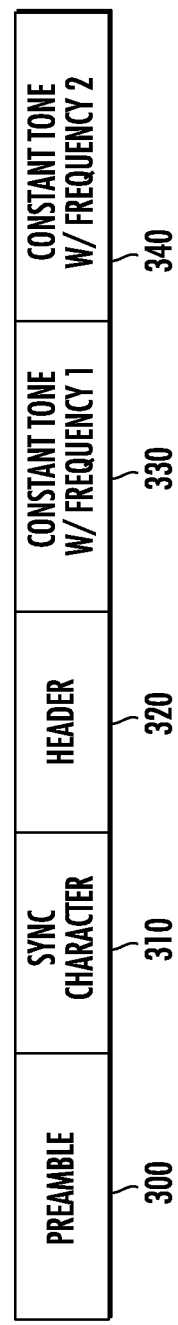
FIG. 5 shows the format of a representative range detection message.

Having described the need for phase continuity and implementations that achieve this objective, one embodiment of the packet format of the ranging packet will be described. In certain embodiments, the network interface 30 operates on a wireless network that utilizes the Bluetooth network protocol. FIG. 5 shows the format of a special Bluetooth packet that is used for range detection. In this embodiment, the range detection packet comprises a preamble 300, which is used to synchronize the clock of the receiver to the frequency and phase of the incoming signal. Next, a sync character 310 may follow. The sync character is a predetermined sequence of bits that are used to denote the boundary between symbols. The sync character described above may be equivalent to the 32-bit "Access Address" in a BLE packet. Following the sync character 310 may be a header 320. The header 320 may include information, such as the identity of the network device transmitting this range detection packet. Following the header 320 may be a first constant tone 330 having the first frequency. Lastly, a second constant tone 340 having the second frequency is transmitted. In one embodiment, the sync character 310 is used to provide an anchor point for the timing for the first constant tone 330 and the second constant tone 340.

In other words, the first constant tone 330 may begin exactly N microseconds after the end of the sync character 310. The second constant tone 340 may start exactly M microseconds after the end of the sync character 310. In this way, the network device receiving the range detection packet knows exactly when the first constant tone 330 and the second constant tone 340 begin.

In certain embodiments, the variable N and M described above may be broadcast from the first network device prior to the transmission of this range detection packet. For example, the first network device 100 may transmit a packet on an advertising channel, where the payload of that packet contains information regarding the parameters that it will utilize for the range detection packet. This information may include the data channel(s) that are to be used for the range detection packet; the delay between the sync character 310 and the first constant tone 330 (i.e. N); the delay between the sync character 310 and the second constant tone 340 (i.e. M); the first frequency used; and the second frequency used.

Thus, in operation, the first network device 100 transmits a packet on an advertising channel. The second network device 110 may receive this packet from the first network device 100 on the advertising channel. This packet will provide all of the information that the second network device 110 requires to find and receive the range detection packet. If the second network device 110 is interested in the first network device 100, the second network device 110 sets its receive circuit 36 so that it is capable of receiving and sampling the incoming range detection packet at the two frequencies. The second network device 110 then receives the range detection packet, switching from the first frequency to the second frequency with phase continuity at the prescribed time. Then, using the equations described above, the distance to the first network device 100 may be determined by the second network device 110.

The above description highlights a system and method to determine the distance from a first network device 100 to a second network device 110 without a network connection, and with no communication from the second network device 110 to the first network device 100.

There are additional modifications that may be performed to improve the accuracy of this distance measurement.

For example, the above system and method relies on the phase of a transmitted signal that has two different frequencies. The phase delay from the antenna through the radio circuit 31 and receive circuit 36 to the ADC 55 may differ depending on frequencies. For example, the phase delay due to the components, such as capacitors and inductors, in the path is a function of frequency. This collection of components may be referred to as the receive group, or Rx group. Therefore, in certain embodiments, the Rx group is calibrated at each frequency that is used for range detection packets. The Rx group delay may be calibrated in a number of ways. For example, the calibration may be performed by the chip manufacturer and provided to the user. In another embodiment, the calibration results may be stored in a one-time programmable (OTP) portion of memory. In another embodiment, the user may perform the calibration and save the results.

In all of these embodiments, the phase difference that is caused by the Rx group delay may be calculated and taken into consideration when calculating the actual phase of the first signal and the second signal.

Additionally, another source of error may be phase delay introduced by the transmit circuit 38 of the first network device 100. This phase error may be calculated in a number of ways. For example, the calibration may be performed by the chip manufacturer and the phase delays for each frequency may be provided to the user. In another embodiment, the calibration results may be stored in a one-time programmable (OTP) portion of memory. In another embodiment, the user may perform the calibration and save the results. For example, a calibration station may be used to receive the frequencies of interest from the first network device. The calibration station can then measure the difference in phase between these two frequencies. This difference can then be stored in an OTP Portion of memory. In yet another embodiment, a loop back test may be performed where the transmit circuit 38 and the radio circuit 31 of the first network device are both in communication with the antenna. The first network device transmits the two frequencies of interest sequentially and simultaneously measures the phase of each of these frequencies as received by the receive group to calculate the phase delay associated with transmission. The result of this calculation may be referred to as the transmitter phase correction.

Figure 6:
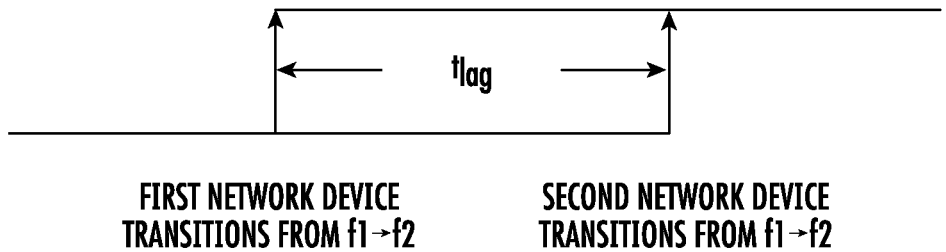

In addition, it is noted that there may be a difference between when the first network device 100 switches to the second frequency and when the second network device 110 believes that this switch occurred. For example, in the first network device 100, the switch between the first frequency and the second frequency may occur at a fixed time after the transmission of the sync character. However, the second network device 110 may not be sampling the incoming signal at the exact sync correlation peak. For example, the second network device 110 may be sampling the incoming signal up to one clock period later than exact sync correlation peak of the incoming signal. This is illustrated in FIG. 6, which shows the potential time lag between when the first network device 100 transitions from the first frequency until the second network device 110 transitions to the second frequency. This time lag may affect the phase measured by the second network device 110 during the second frequency. Specifically, the phase error may be equal to:

Phase error=$2\pi(f_2-f_1)*t_{lag}$, where $t_{lag}$ is the time lag.

Figure 7:
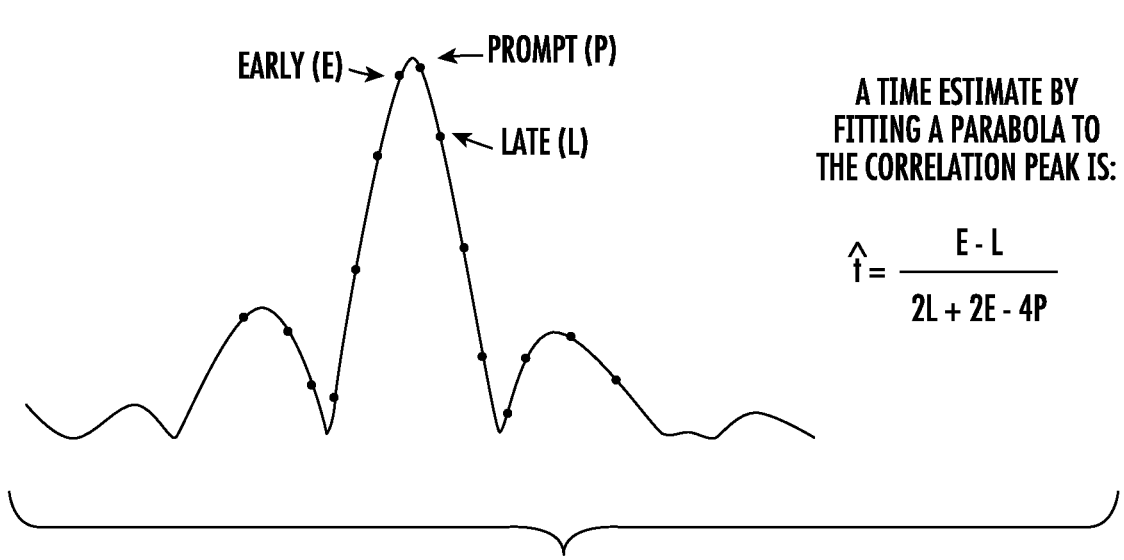
FIG. 7 shows a method to estimate the time lag.

This phase error may be minimized by calculating the time lag. Specifically, as shown in FIG. 7, the incoming data's correlation amplitude peak may be approximated as a parabola. From sampling the incoming signal, there will be correlation amplitude points that are before the perceived peak value, correlation amplitude points that are after the perceived peak value, and a correlation amplitude point that is the perceived peak point, which may be referred to as the prompt point. Using three consecutive points; one before the prompt point, referred to as the early point (E), the prompt point (P) and one after the prompt point, referred to as the late point (L), the time delta between the actual peak and the prompt point can be estimated as:

$$\Delta t = \frac{E-L}{2E+2L-4P}$$

Thus, using the above equation, the second network device 110 may estimate the time lag. In some embodiments, this calculation may be performed a plurality of times. These multiple calculated values may be averaged to achieve better accuracy. Alternatively, the sync length may be increased. Using all of this information, the second network device 110 may calculate the time for the signal from the first network device 100 to reach the second network device 110 as:

$tp=(1/2\pi)*(\theta_2-\theta_1)/(f_2-f_1)$–Rx group delay–transmitter phase correction–$t_{lag}$.

Of course, in certain embodiments, the second network device 110 may not utilize the Rx group delay, the transmitter phase correction and/or the $t_{lag}$ in determining the time.

As an enhancement to this procedure, the second network device 110 may also determine a quality value associated with the above measurements.

For example, as described above, to determine the phase rotation due to frequency offset, a plurality of phase measurements are made between time T1 and time T2. As described above, these phase measurements should ideally form a line, where the slope of that line is the frequency offset ($\Delta\omega$). In addition to calculating the slope, the second network device 110 may calculate the variance of that line. The variance may be used to create the quality metric. A low variance indicates that the measurements are accurate and are likely not affected by noise. A high variance indicates that the measurements are likely affected by noise and may not be accurate. Thus, if the variance is above a predetermined threshold, the second network device 110 may ignore the phase measurements that were obtained during this range detection packet. Alternatively or additionally, the second network device 110 may calculate the variance for a plurality of phase measurements taken between time T4 and time T5. Similar decisions may be made based on the calculated variance of these phase measurements.

Figure 8:
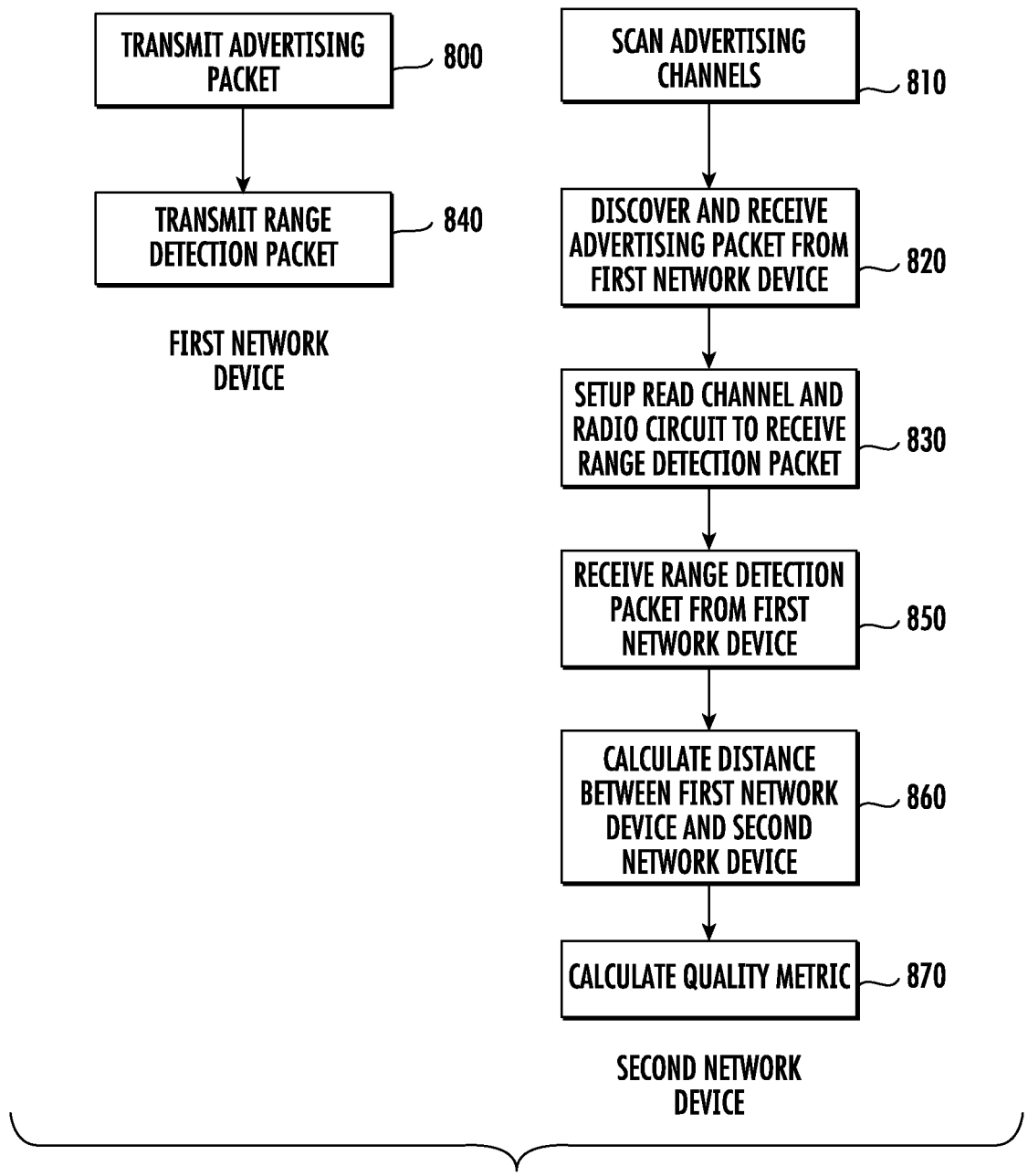
FIG. 8 shows a flowchart describing the operation of two network devices.

A one way ranging system is disclosed. This system utilizes precise timing and two different frequencies to determine the distance between a first network device 100 and a second network device 110. FIG. 8 shows an illustrative example of how this method may be used. First, as shown in Box 800, the first network device 100 may transmit an advertising packet on an advertising channel. This advertising packet may include information about the first network device 100. This advertising packet may also include the PHY to be used during the range detection packet, such as 1 Mbps or 2 Mbps. Additionally, this advertising packet may include parameters associated with the range detection packet. These parameters may include:

the time between the sync character and the start of the first frequency;
the time between the sync character and the start of the second frequency;
the time between the start of the first frequency and the start of the second frequency;
the first frequency;
the second frequency;
the channel used to transmit the first frequency;
the channel used to transmit the second frequency;
the hopping sequence;
the transmitter phase correction; and
the length of the sequence.

In parallel, as shown in Box 810, the second network device 110 may be scanning the various advertising channels. The second network device 110 may discover the advertising packet transmitted by the first network device 100 and receive this advertising packet, as shown in Box 820. The second network device 110 then parses the packet to identify the sender, and the parameters that are associated with the corresponding range detection packet. If the second network device 110 is interested in tracking this first network device 100, the second network device 110 may, using the processing unit 20, set up the receive circuit 36 and radio circuit 31 to receive the range detection packet, as shown in Box 830. The first network device 100 may then begin transmitting the range detection packet, as shown in Box 840. The second network device 110 then receives this range detection packet, as shown in Box 850. The second network device 110 samples the phase of the incoming signal as described above. The second network device 110 may also calculate the time lag and the Rx group delay. Using this information, the second network device 110 computes the distance between the first network device 100 and the second network device 110, as shown in Box 860. The second network device 110 may also use the transmitter phase correction transmitted by the first network device 100 during the advertising packet. Additionally, the second network device 110 may determine a quality metric associated with this distance measurement, as shown in Box 870.

The distance from a first network device 100 to a second network device 110 may be used for many applications. For example, the range detection may be used in conjunction with angle of arrival or departure algorithms. For example, by determining an angle of arrival and the distance to the first network device 100, it is possible for the second network device 110 to estimate the three-dimensional position of the first network device 100. This location information may be used in a plurality of ways. For example, if a first network device (or tag) is installed on each of a plurality of assets in a warehouse, the second network device (or locator) may be able to identify the location of a specific asset. In some embodiments, there may be multiple locators (receivers), which each measure their distance to tag (transmitter). The locators send their measurements to a master locator (or another processing unit) that uses the locators' known positions and distance measuremenst to calculate tag position as the intersection of multiple spheres, similar to GPS. Further, there are applications beyong industrial asset tracking. For example, the two network devices may also operate as a proximity sensor. For example, when the user (holding a tag) approaches an automobile (acting as a locator), the doors may automatically unlock. This concept can be expanded to zone creation, where an event is triggered when a user enter/exits a geographical zone. Additionally, this system of network devices may also be used to track pets or locate personal objects.

The present system and method has many advantages. First, this system and method does not require a network connection between the first network device and the second network device. Because of this, the second network device is able to track many more devices than would be possible if the second network device was required to establish a network connection with each. Thus, the present system and method are far more scalable than two-way range detection systems.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of determining a distance between two network devices, comprising:
   transmitting, from a first network device, a range detection packet, wherein the range detection packet comprises a first constant tone wherein a first frequency is transmitted and a second constant tone wherein a second frequency is transmitted and wherein there is phase continuity during a transition from the first constant tone to the second constant tone;
   receiving, at a second network device, the range detection packet;

sampling, at the second network device, the range detection packet using a sample clock, wherein the sample clock has phase continuity during the transition from the first constant tone to the second constant tone, wherein the second network device samples a phase of the first constant tone to create a first sample having a first phase and samples a phase of the second constant tone to create a second sample having a second phase;

determining a frequency difference between a clock used by the first network device and the second network device;

using the frequency difference, the first phase and the second phase to determine a distance from the second network device to the first network device.

2. The method of claim 1, wherein the second network device samples the first constant tone a plurality of times to create a plurality of samples, recording a phase of the first constant tone and a time of each sample, and uses a difference in phase divided by a difference in time to determine the frequency difference.

3. The method of claim 2, wherein the second network device creates a line based on the plurality of samples, calculates a variance of the line and determines a quality metric based on the variance.

4. The method of claim 3, wherein the second network device discards the plurality of samples if the variance is above a predetermined threshold.

5. The method of claim 1, wherein a time between when the first network device begins transmitting the first constant tone and starts transmitting the second constant tone is defined as T and is equal to a time between when the second network device creates the first sample and when the second network device creates the second sample.

6. The method of claim 1, wherein the first network device transmits a transmitter phase correction value to the second network device prior to the range detection packet, the transmitter phase correction value being a difference in phase delay through transmit components of the first network device at the first frequency and the second frequency, and wherein the second network device uses the transmitter phase correction value to determine the distance from the second network device to the first network device.

7. The method of claim 1, wherein a receiver group delay is calculated for the second network device, the receiver group delay defined as a difference in phase delay through read components of the second network device at the first frequency and the second frequency, and the second network device uses the receiver group delay to determine the distance from the second network device to the first network device.

8. The method of claim 1, wherein the second network device calculates a time lag, the time lag defined as a difference between a time that the second network device begins sampling at the second frequency and a time that the first network device switches to the second constant tone.

9. The method of claim 8, wherein the second network device uses the time lag to determine the distance from the second network device to the first network device.

10. A system for measuring a distance between two network devices, comprising:
a first network device to transmit a range detection packet, wherein the range detection packet comprises a first constant tone wherein a first frequency is transmitted and a second constant tone wherein a second frequency is transmitted and wherein there is phase continuity during a transition from the first constant tone to the second constant tone;
and
a second network device, comprising:
a network interface,
a processing unit, and
a storage device containing instructions, which when executed by the processing unit, enable the second network device to:
receive the range detection packet;
sample the range detection packet using a sample clock, wherein the sample clock has phase continuity during the transition from the first constant tone to the second constant tone, wherein the second network device samples the first constant tone to create a first sample having a first phase and samples the second constant tone to create a second sample having a second phase;
determine a frequency difference between a clock used by the first network device and the second network device; and
determine a distance from the second network device to the first network device using the frequency difference, the first phase and the second phase.

11. The system of claim 10, wherein the second network device samples the first constant tone a plurality of times to create a plurality of samples, records a phase of the first constant tone and a time of each sample, and uses a difference in phase divided by a difference in time to determine the frequency difference.

12. The system of claim 11, wherein the second network device creates a line based on the plurality of samples, calculates a variance of the line and determines a quality metric based on the variance.

13. The system of claim 12, wherein the second network device discards the plurality of samples if the variance is above a predetermined threshold.

14. The system of claim 10, wherein a time between when the first network device begins transmitting the first constant tone and starts transmitting the second constant tone is defined as T and is equal to a time between when the second network device creates the first sample and when the second network device creates the second sample.

15. The system of claim 10, wherein the first network device transmits a transmitter phase correction value to the second network device prior to the range detection packet, the transmitter phase correction value being a difference in phase delay through transmit components of the first network device at the first frequency and the second frequency, and wherein the second network device uses the transmitter phase correction value to determine the distance from the second network device to the first network device.

16. The system of claim 10, wherein a receiver group delay is calculated for the second network device, the receiver group delay defined as a difference in phase delay through read components of the second network device at the first frequency and the second frequency, and the second network device uses the receiver group delay to determine the distance from the second network device to the first network device.

17. The system of claim 10, wherein the second network device calculates a time lag, the time lag defined as a difference between a time that the second network device begins sampling at the second frequency and a time that the first network device switches to the second constant tone.

18. The system of claim 17, wherein the second network device uses the time lag to determine the distance from the second network device to the first network device.

* * * * *